United States Patent [19]

Zielke et al.

[11] 4,424,111
[45] Jan. 3, 1984

[54] REGENERATION OF ZNC12

[75] Inventors: Clyde W. Zielke, McMurray; William A. Rosenhoover, Pittsburgh, both of Pa.

[73] Assignee: Conoco Inc., Wilmington, Del.

[21] Appl. No.: 383,916

[22] Filed: Jun. 1, 1982

[51] Int. Cl.³ .......................... C10G 1/06; C01B 9/00; B01J 27/32; B01J 35/12
[52] U.S. Cl. ...................... 208/10; 208/108; 208/112; 208/116; 502/35; 502/55
[58] Field of Search .............. 208/108, 112, 116, 121, 208/10; 252/420, 415

[56] References Cited

U.S. PATENT DOCUMENTS

| | | | |
|---|---|---|---|
| 2,425,995 | 8/1947 | Christensen | 423/107 |
| 2,786,086 | 3/1957 | Gitterman | 208/116 |
| 2,899,384 | 8/1959 | Swabb, Jr. et al. | 208/149 |
| 3,256,205 | 6/1966 | Conetabaris et al. | 252/413 |
| 3,355,376 | 11/1967 | Gorin et al. | 208/10 |
| 3,625,861 | 12/1971 | Gorin et al. | 208/10 |
| 4,081,400 | 3/1978 | Gorin | 208/10 |
| 4,134,826 | 1/1979 | Gorin | 208/108 |
| 4,136,056 | 1/1979 | Zielke | 208/10 |
| 4,162,963 | 7/1979 | Gorin | 208/108 |
| 4,216,118 | 8/1980 | Yoshida et al. | 252/415 |
| 4,257,873 | 3/1981 | Zielke et al. | 208/108 |
| 4,257,914 | 3/1981 | Zielke et al. | 208/10 |
| 4,261,809 | 4/1981 | Gorin et al. | 208/108 |
| 4,280,895 | 7/1981 | Stuntz et al. | 208/113 |

FOREIGN PATENT DOCUMENTS

| | | | |
|---|---|---|---|
| 3819577 | 3/1961 | Japan . | |
| 286678 | 3/1928 | United Kingdom | 208/112 |

Primary Examiner—Delbert E. Gantz
Assistant Examiner—O. Chaudhuri
Attorney, Agent, or Firm—Dale Lovercheck; William A. Mikesell, Jr.

[57] ABSTRACT

A method of hydrocracking using a zinc catalyst in the hydrogenation step comprising providing a hydrocarbonaceous feed of coal or tar to a hydrogenation means,
removing spent zinc and catalyst from said hydrogenation means to a regeneration means,
heating said spent zinc catalyst in said regeneration means,
providing hydrogen chloride to said regeneration means,
said spent zinc catalyst comprising ZnS, whereby $ZnCl_2$ gas is formed,
contacting at least a portion of said $ZnCl_2$ with steam to form ZnO,
conveying said ZnO and $ZnCL_2$ to said hydrogenation means.

11 Claims, 1 Drawing Figure

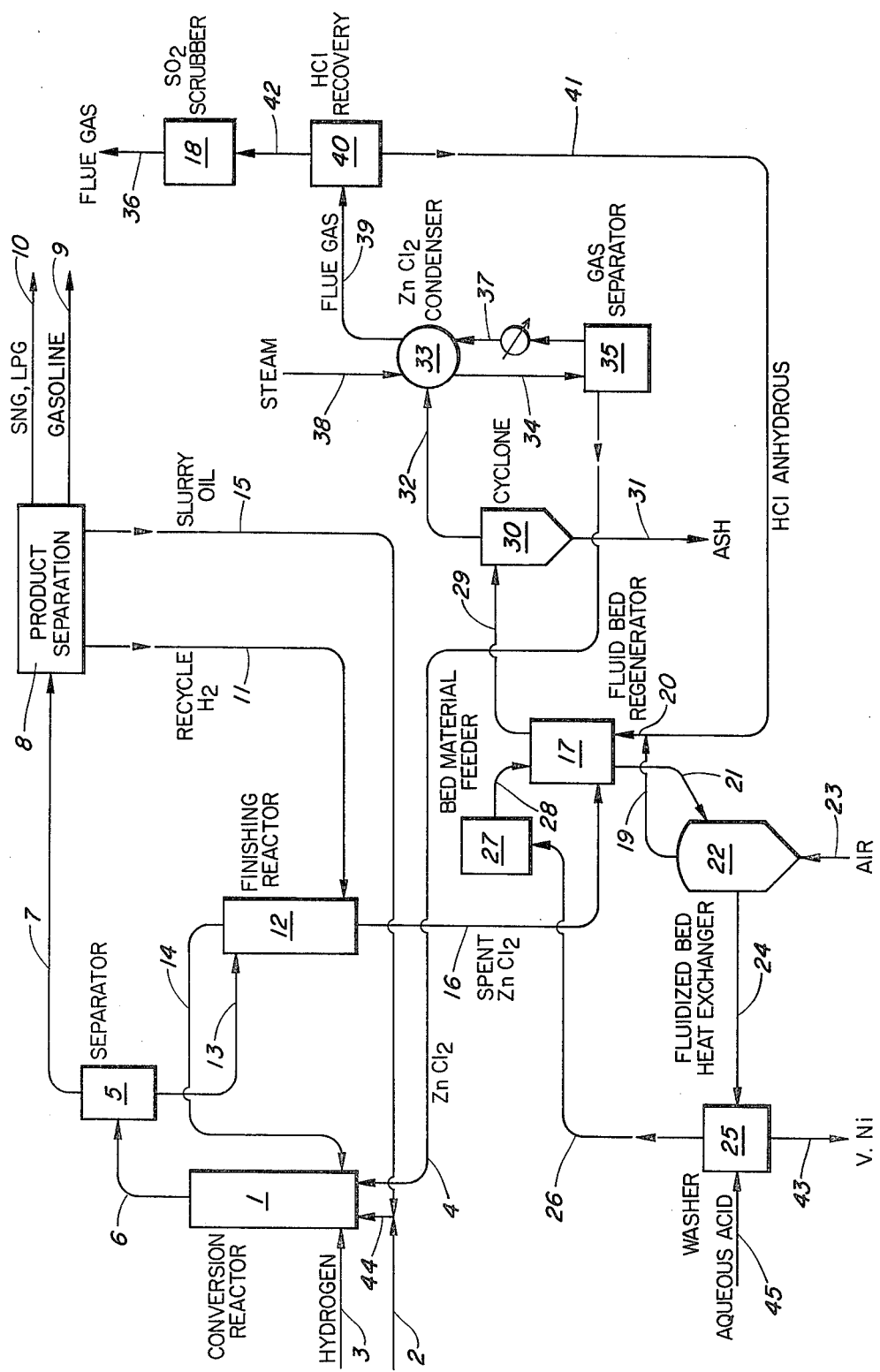

REGENERATION OF ZNCl2

BACKGROUND OF THE INVENTION

Gorin in U.S. Pat. No. 4,081,400 discloses regeneration of zinc halide catalyst used in the hydrocracking of polynuclear hydrocarbons the Gorin process provides for oxidative vapor phase regeneration by selective treatment of zinc oxide carried over by effluent vapors from the regeneration zone with hydrogen halide gas under conditions favoring the reaction of zinc oxide with the hydrogen halide.

Zielke et al U.S. Pat. No. 4,257,914 discloses a method for regeneration of spent molten zinc chloride which has been used in hydrocracking of coal or ash containing polynuclear aromatic hydrocarbonaceous materials derived therefrom and which contain zinc chloride, zinc oxide zinc oxide complexes and ash containing carbonaceous residues by incinerating the spent molten zinc chloride to vaporize the zinc chloride for subsequent condensation to produce a purified molten zinc chloride.

Yoshida et al U.S. Pat. No. 4,216,118 discloses process for recovering vanadium from spent catalyst which were used in hydrodesulfurization, hydrodemetalization, etc. of heavy oils until metal in said heavy oils accumulated thereon in their process spent catalysts are chlorinated with chlorinadine agents at temperatures below 600° C. without being subjected to calcination so as to convert almost all of the vanadium compounds to vanadium tetrachloride.

Gorin U.S. Pat. No. 4,134,826 discloses a process for hydrocracking heavy polynuclear carbonaceous feedstock to produce lighter hydrocarbon fuels by contacting the heavy feedstocks with hydrogen in the presence of molten metal halide catalyst thereafter separating at least a substantial portion of the carbonaceous material associated with the reaction mixture from the spent molten metal halide and thereafter regenerating the metal halide catalyst.

Schwab, Jr. et al U.S. Pat. No. 2,899,384 discloses a reactor and regenerator in combination.

Stuntz et al U.S. Pat. No. 4,280,895 discloses a method of passivating a catalyst utilized to crack hydrocarbon feedstock where the feedstock contains at least two metal contaminates selected from the class consisting nickel vanadium and iron and where these contaminates become deposited on the catalyst. A method comprises passing the catalyst from the reaction zone through a reduction zone maintained at elevated temperature for the time sufficient to at least partially passivate the catalyst.

Gorin et al U.S. Pat. No. 3,625,861 discloses regeneration of zinc halide catalyst used in hydrocracking of polynuclear hydrocarbons wherein the spent zinc halide cracking catalyst prior to oxidation to remove impurities as needed to carbonize organic residue to drive off volatiles and to decompose zinc halide ammonia complex and drive off ammonia.

Zielke et al U.S. Pat. No. 4,257,873 discloses a process of hydrocracking by contacting the feedstocks with hydrogen in the presence of molten zinc chloride the improvement comprising iron chloride content of the molten zinc chloride to from about 2 to about 12 mole percent based on the mixture of ferrous chloride and molten zinc chloride.

Zielke U.S. Pat. No. 4,136,056 discloses improved rate of recovery of zinc values from solids by treatment of the solids with both hydrogen chloride and calcium chloride to selectively and rapidly recover zinc values as zinc chloride.

Gorin et al U.S. Pat. No. 4,261,809 discloses an improved process of hydrocracking of heavy aromatic polynuclear carbonaceous feedstocks the improvement comprising contacting gaseous acid gas hydrogen and hydrocarbon fuels containing stream with the feedstock containing reactive alkaline constituents to remove acid gases from the acid gas containing stream.

Kristenson U.S. Pat. No. 2,425,995 discloses a process for treatment of oxidized zinc ores with the recovery of zinc from zinc ore as pure zinc chloride or as metal.

Gitterman U.S. Pat. No. 2,786,086 discloses hydrocarbon conversions using metal halide catalyst including zinc chloride.

Conetabaris et al in U.S. Pat. No. 3,256,205 discloses a method of catalyst rejuvenating including deactivated hydrocracking catalyst which has become exposed to hydrocarbon under hydrocracking conditions. The first step of the process is to contact deactivated catalyst having carbonaceous deposits thereon with an acid solution suitable acids include hydrochloric acid. Note column 4, lines 14 through 19.

Sinclair Refining Company, Japan No. 38-19577 discloses a process for treating silica catalyst useful in the conversion of hydrocarbons at high temperature and containing a poisonous metal such as nickel or vanadium comprising washing with an aqueous solution.

BRIEF DESCRIPTION OF THE DRAWING

The drawing shows a schematic representation of a fluidized bed regeneration system in accordance with the present invention.

SUMMARY OF THE INVENTION

A method of hydrocracking using a zinc catalyst in the hydrogenation step comprising providing a hydrocarbonaceous feed of coal or tar to a hydrogenation means, removing spent zinc and catalyst from said hydrogenation means to a regeneration means, heating said spent zinc catalyst in said regeneration means, providing hydrogen chloride to said regeneration means, said spent zinc catalyst comprising ZnS, whereby $ZnCl_2$ gas is formed, contacting at least a portion of said $ZnCl_2$ with steam to form ZnO, conveying said ZnO and $ZnCl_2$ to said hydrogenation means.

DETAILED DESCRIPTION OF THE INVENTION

A system in accordance with the present invention is shown in the drawing. Conversion reactor 1 which may be a series of conversion reactors receives coal or coal extract (SRC) or heavy tar, petroleum vacuum bottoms, coker distillate, shale oil, tar sands bitumen or other heavy carbonaceous feedstocks through feedline 44. Coal which has been ground to fine particles is fed through line 2 and mixes in line 44 with slurry oil from line 15. Alternatively the feed may be other heavy carbonaceous materials as described above. Hydrogen is fed to the conversion reactor 1 through hydrogen feedline 3. Liquefaction product and molten $ZnCl_2$ catalyst leave the conversion reactor(s) 1 through line 6. The liquefaction product in line 6 is fed to the separator 5 the lighter fraction of the liquefaction product passes through line 7 to the product separator 8. Gasoline passes through line 9 from the product separator 8 to product storage not shown in the Figure. The lighter fuel gas is passed through line 10 to product storage or directly for use for example as fuel gas. Slurry oil (recycle oil) passes through line 15 from the product separation unit 8. Hydrogen passes from the product separation unit 8 through line 11 to the finishing reactor 12. The heavier fraction contained in the $ZnCl_2$ catalyst passes from the separator 5 through line 13 to the finishing reactor 12. The lighter fraction and hydrogen passes from the finishing reactor 12 through line 14 for recycle to the conversion reactor 1. The spent zinc chloride catalytic material passes through line 16 to the fluidized bed regenerator 17. Anhydrous hydrogen chloride is fed through line 41 into line 20 where it mixes with preheated air from line 19. Line 20 is in fluid flow communication with the fluid bed regenerator 17. Residual carbon on the spent zinc chloride catalytic material is combusted by the air. This combustion provides heat. The spent catalyst is made up of zinc compounds which are produced in the hydrocracking processes occurring in the conversion reactor(s) 1 and finishing reactor 12 some of these reactions are as follows:

$$H_2O + ZnCl_2 \rightleftharpoons ZnO + 2HCl$$

$$H_2S + ZnCl_2 \rightarrow ZnS + 2HCl$$

$$NH_3 + ZnCl_2 \rightarrow ZnCl_2 \cdot NH_3$$

$$ZnCl_2 \cdot NH_3 + HCl \rightleftharpoons ZnCl_2 \cdot NH_4Cl$$

The spent zinc chloride catalytic material includes zinc sulfide, zinc oxide, complexes of zinc chloride and ammonium chloride as well as zinc chloride and ammonia. The following reactions occur in the fluid bed regenerator 12:

$$ZnS + 3/2 O_2 \rightarrow ZnO + SO_2$$

$$ZnO + 2HCl \rightarrow ZnCl_2 + H_2O$$

$$ZnCl_2 \cdot NH_4Cl \rightarrow ZnCl_2 \cdot NH_3 + HCl$$

$$2ZnCl_2 \cdot NH_3 + 3/2 O_2 \rightarrow 2ZnCl_2 + N_2 + 3H_2$$

In the regenerator defluidization will occur in the presence of substantial portions of vanadium and/or nickel which is commonly contained in heavy petroleum feedstocks, tar sands, etc. To avoid defluidization, a portion of the fluidized bed material is withdrawn from the fluid bed regenerator 17 through line 21. The fluidized bed material which is withdrawn through line 21 is used to preheat air from line 23 which is fed into fluidized bed heat exchanger 22. Finely divided loose ash carried in via stream 21 will be entrained in the gas stream and returned to the regenerator via lines 19 and 20. The cooled fluidizable bed material is fed from the fluidized bed heat exchanger 22 through line 24 to the washer 25. Aqueous acid, for example aqueous hydrochloric acid is fed to the washer 25 through line 45. The washed fluidizable bed solids are conveyed through line 26 to the bed material feeder 27. The washed fluidizable bed material is fed through line 28 to the fluid bed regenerator 17. V and Ni are removed from washer 25 through line 43.

The fluid bed regenerator 17 is operated at a temperature sufficient to maintain zinc chloride in the gaseous state. Gaseous materials and finely divided entrained noncombustible (ash) pass through line 29 to the cyclone 30. Ash is separated in the cyclone 30 and withdrawn though line 31. The zinc chloride rich gas passes through line 32 to the condenser 33.

Where zinc oxide in addition to zinc chloride is needed, for example, where the liquefaction hydrocarbonaceous material is high in sulfur, steam is added as part of the condensation process. Steam may be fed through line 38 to the condenser. The steam reacts with zinc chloride to produce zinc oxide and hydrogen chloride. The cooled zinc chloride mixture then passes through line 34 to the gas separator 35. Gases are recycled to the condenser through line 37. The zinc chloride catalyst in its regenerated state passes through line 4 to the conversion reactor 1. The flue gas from the condenser passes through line 39 to a hydrogen chloride and recovery unit 40. The sulfur dioxide passes through line 42 from the recovery unit 40 to the $SO_2$ scrubber 18. Flue gas passes from scrubber 18 through line 36. Anhydrous HCl passes through line 41 from the hydrogen chloride recovery unit 40.

Heavy tars and crude oils are amenable to upgrading, via the $ZnCl_2$ process, to produce lower boiling, lower molecular weight, low nitrogen, low sulfur products which are in general, more valuable products. These feed tars often have high sulfur contents (3-12%) as well as substantial concentrations of Vanadium (V) and nickel (Ni) and may have significant amounts of other other mineral components ($SiO_2$, $Al_2O_3$, $Fe_2O_3$, etc.) which are termed ash.

The high sulfur content of the feedstocks makes it desirable to operate the hydrocracker in the HCl-acceptor mode, i.e., with ZnO added to the molten $ZnCl_2$ catalyst. The role of the ZnO is to absorb the copious amount of HCl that stems from the sulfur in the feed.

$$H_2S + ZnCl_2 \rightarrow ZnS + 2HCl$$

$$2HCl + ZnO \rightarrow ZnCl_2 + H_2O$$

Without the ZnO addition, the HCl produced unfavorably promotes coking of the feedstock which reduces the yields of valuable products and can have adverse effects on hydrocracker operation. Sufficient ZnO is used to absorb on the order of 70-95+% of the HCl generated. A small amount of HCl may be wanted to act as a cracking promoter but the amount should be insufficient to induce substantial coking. Excess ZnO is undesirable since it inhibits the $ZnCl_2$ catalyst activity.

The "spent" $ZnCl_2$ melt leaving the hydrocracker contains, in addition to the usual nitrogen, sulfur, carbon and ash impurities, essentially all of the Ni and V that was in the feedstock. This spent melt must be regenerated to keep the catalyst active. Regeneration consists of removal of the impurities and restoration of the catalyst to essentially pure $ZnCl_2 + ZnO$, the ZnO being in the proper concentration for HCl absorption in the hydrocracker.

The regeneration is carried out in a fluidized bed combustor at 1500° to 2100° F. preferably about 1700°-1900° F., and 1 to 6 but preferably 4-5 atm pressure. It has been found in this type of regeneration that the V and Ni in the feedstock to regeneration (which stem from the V and Ni in the heavy tar on crude hydro feed) are almost completely retained in the fluidized combustor bed and that they cause bed defluidization, and hence, inoperability, at relatively low concentrations. Hence, to maintain an operable system, a side stream of the bed solids must be continuously removed, cleaned of V and Ni and returned to the bed at such a rate so as to keep the V and Ni concentrations in the bed lower than that which causes defluidization. Most of the V and Ni is removed from the bed solids at room temperature with hydrochloric acid. A higher temperature of the order of 150 to 200° F. is preferred.

To operate the combustion regenerator in the ZnO acceptor mode, only sufficient HCl (~3 mol % of the feed air) would be added to the feed air to prevent hydrolysis of the $ZnCl_2$ by steam generated from hydrogen in the spent melt feed but insufficient HCl to convert the ZnO, generated by oxidation of ZnS, to $ZnCl_2$. The problem then is that the ZnO thus generated is partially retained in the fluidized bed (along with the V, Ni and other ash), as $ZnO.SiO_2$ or $ZnO.Al_2O_3$ by interaction with the bed solids, or simply in the form of ZnO. This retention of the Zn values and ash in the bed complicates the clean removal of Ni and V from the bed via the side stream and subsequent cleanup without substantial zinc loss or costly Zn, V, Ni and ash separation techniques after the wash of the sidestream of bed solids. More than 1% excess air preferable about 15% is used to assure complete combustion of all ZnS to ZnO and essentially complete burnout of the other impurities.

Sufficient HCl is added to the feed air to the regenerator 17 to react with all of the ZnO generated by oxidation of ZnS to form $ZnCl_2$ (it is assumed in determining the HCl that all of the ZnS goes to ZnO), and an excess of HCl in an amount equal to at least 5 mol % but preferably 8 mol % or more of the feed air. This excess HCl converts all of the ZnO to $ZnCl_2$, prevents hydrolysis of $ZnCl_2$ to ZnO and prevents interaction of ZnO with the bed solids to form $ZnO.SiO_2$. Hence, the bed is essentially free of zinc and the side stream of sand or alundum bed solids sent to a washer 25 contains essentially only V and Ni as impurities. Therefore, essentially no Zn losses are incurred here and the V and Ni washed from the sand are in relatively pure form in solution which increases their market value. The heat is recovered from the side stream of bed solids by preheat of the feed air in a fluidized heat exchanger before the solids are sent to the wash step. The Ni-V-"free" washed solids are returned to the regenerator.

The $ZnCl_2$ vapor and combustion gases in the regenerator entrain any other ash such as $SiO_2$, $Al_2O_3$, $Fe_2O_3$, CaO, etc. and leave the regenerator. The ash is removed from the vapor stream via a cyclone as the cyclone underflow. Note that since no ZnO is in the combustor, no ZnO is entrained to contaminate the ash in the cyclone underflow. The cyclone overflow, consisting of $ZnCl_2$ vapor plus combustion gases, enters the top of the $ZnCl_2$ condensation zone preferably at 1700°–1900° F. Sufficient steam is introduced to hydrolyze sufficient $ZnCl_2$ to produce the desired amount of ZnO in the product $ZnCl_2$. The steam partially cools the vapors and gases and the ZnO dust which then proceed to a zone which is a $ZnCl_2$ spray tower wherein $ZnCl_2$ vapor condensation is completed and the hydrolysis reaction is quenched. The suspension of ZnO in the molten $ZnCl_2$ is separated from the gases and sent to hydrocracking. The gases go to HCl removal from whence the HCl is recycled to the regenerator. There is no net consumption of HCl generated in the fluidized bed regenerator operated as described. Defluidization of the fluid bed regenerator occurs for example where the liquefaction hydrocarbonaceous material is high in vanadium and/or nickel. To avoid defluidization the process of the present invention provides for an integral washing of the fluidized bed material during the regeneration process.

In the case where coal is fed, defluidization can occur due to retention of NaCl and/or KCl in the bed (coal contains only traces V or Ni). The same system accordingly applies. Water or HCl washing would be adequate for Na or K removal.

In the case where the coal or ash-containing feedstock does not contain defluidization materials such as V, Ni, K or Na there is no need for washing the solids but the scheme for producing a $ZnCl_2$ melt with ZnO for operating the regenerator in the HCl acceptor fashion is still advantageous.

Having thus described the invention by reference to certain of its preferred embodiments it is respectfully pointed out that embodiments described are illustrative rather than limiting in nature and that many variations and modifications are possible within the scope of the present invention. Such variations and modifications may appear obvious and desirable to those skilled in the art upon a review of the foregoing description of preferred embodiments.

Having thus described the invention, we claim:

1. A method for lowering defluidization during fluidized bed regeneration of spent zinc chloride catalyst and catalytically hydrogenating a coal or tar hydrocarbonaceous material comprising:

conveying hydrocarbonaceous material to a hydrogenation means, said hydrogenation means containing zinc chloride catalyst, providing a fluidized bed regenerator having fluidizable bed material, feeding spent zinc chloride catalyst comprising a defluidization agent selected from the group consisting of vanadium, nickel, sodium or potassium to said fluidized bed regenerator from said hydrogenation means, said fluidized bed regenerator being operated at about 1500° to 2100° F. and about 1 to 6 atmospheres pressure whereby zinc chloride vapor is formed, feeding said zinc chloride vapor to a condensor means to form regenerated zinc chloride solid catalyst;

feeding a portion of spent fluidizable bed material from said fluidized bed regenerator, to a washing means, said spent fluidized bed material comprising a defluidization agent, washing said spent fluidizable bed material in said washing means with aqueous acid to produce washed fluidizable bed material, said washed fluidizable bed material comprising less defluidization agent than said spent fluidizable bed material, conveying said washed fluidizable bed material to said fluidized bed regenerator, conveying regenerated zinc chloride solid catalyst from said condensor means to a hydrogenation means.

2. The method of claim 1 wherein said hydrocarbonaceous material comprises coal.

3. The method of claim 1 wherein said hydrocarbonaceous material comprises tar.

4. The method of claim 1 wherein said hydrocarbonaceous material contains vanadium.

5. The method of claim 1 wherein said hydrocarbonaceous material contains nickel.

6. The method of claim 1 wherein said hydrocarbonaceous material contains sodium or potassium.

7. The method of claim 1 further comprising feeding steam to said condensor means whereby hydrogen chloride is formed and
   feeding said hydrogen chloride to said fluidized bed regenerator.

8. A method of catalyst regeneration and hydrocracking an ash containing coal or tar hydrocarbonaceous feed stock material having about 3 percent or higher sulfur content using a zinc oxide containing zinc chloride catalyst comprising
   providing a catalyst comprising a mixture of zinc chloride zinc oxide, in a hydrogenation means,
   hydrocracking said hydrocarbonaceous feed in said hydrogenation means, said hydrocarbonaceous feed comprising sulfur whereby at least a portion of said zinc chloride forms HCl and ZnS, and said catalyst forms a spent catalyst mixture comprising ZnS,
   conveying at least a portion of said spent catalyst mixture from said hydrogenation means to a fluidized bed regeneration means,
   conveying hydrogen chloride to said regeneration means,
   heating said spent catalyst mixture in said regeneration means in the presence of said hydrogen chloride whereby $ZnCl_2$ vapor is formed,
   conveying said $ZnCl_2$ vapor from said regeneration means to a contactor means,
   contacting said $ZnCl_2$ vapor with steam in said contactor means to form a regenerated catalyst comprising a mixture of zinc oxide and zinc chloride solid,
   conveying said regenerated catalyst mixture of ZnO and $ZnCl_2$ to said hydrogenation means,
   whereby said spent catalyst mixture is regenerated to form a regenerated catalyst mixture of zinc chloride and zinc oxide.

9. The method of claim 8 wherein said regenerated catalyst mixture of zinc oxide and zinc chloride comprises each as a substantial portion thereof.

10. The method of claim 8 wherein said regenerated catalyst mixture of zinc oxide and zinc chloride conveyed to said hydrogenation means comprises sufficient zinc oxide to absorb about 70 or more percent of the hydrogen chloride generated in said hydrogenation means.

11. A method of catalyst regeneration and hydrocracking an ash containing coal or tar hydrocarbonaceous feed stock material having about 3 percent or higher sulfur content containing vanadium or nickel using a zinc oxide containing zinc chloride catalyst and lowering defluidization during fluidized bed regeneration of said catalyst comprising
   providing a catalyst comprising zinc chloride and zinc oxide, in a hydrogenation means,
   hydrocracking said hydrocarbonaceous feed of coal or tar in said hydrogenation means, said hydrocarbonaceous feed comprising sulfur and vanadium, or nickel, whereby at least a portion of said zinc oxide forms ZnS, and said catalyst forms a spent catalyst mixture comprising ZnS and vanadium or nickel,
   conveying at least a portion of said spent catalyst mixture from said hydrogenation means to a fluidized bed regeneration means,
   conveying hydrogen chloride to said regeneration means,
   heating said spent catalyst mixture in said regeneration means in the presence of said hydrogen chloride whereby $ZnCl_2$ vaor is formed,
   conveying said $ZnCl_2$ vapor from said regeneration means to a contactor means,
   contacting at least a portion of said $ZnCl_2$ vapor with steam in said contactor means to form a regenerated catalyst comprising a mixture of ZnO and $ZnCl_2$ solid,
   conveying said regenerated catalyst mixture of ZnO and $ZnCl_2$ to said hydrogenation means,
   withdrawing a portion of fluidizable bed material from said fluidized bed regeneration means to a washing means,
   washing said portion of said fluidizable bed material in said washing means with aqueous acid to produce washed fluidizable bed material,
   conveying said washed fluidizable bed material to said fluidized bed regeneration means, whereby said washed fluidizable bed material comprises less vanadium or nickel than said fluidizable bed material in said fluidized bed regenerator means and defluidization in said fluidized bed regenerator means from vanadium or nickel is lowered, and said spent catalyst mixture is regenerated to form a regenerated catalyst mixture of zinc chloride and zinc oxide.

* * * * *